UNITED STATES PATENT OFFICE.

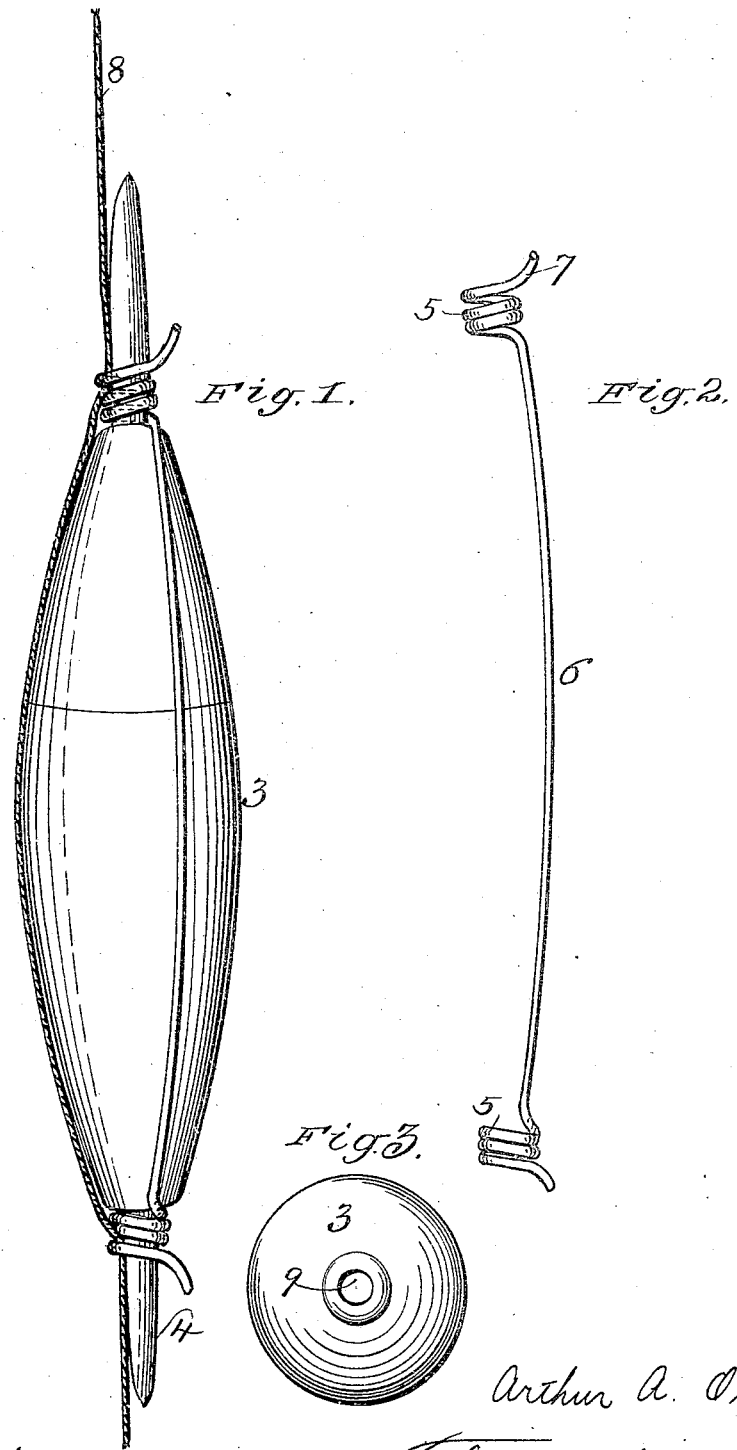

ARTHUR A. OWENS, OF SPRINGFIELD, MISSOURI.

FISHING-FLOAT.

943,450.  Specification of Letters Patent.  Patented Dec. 14, 1909.

Application filed April 6, 1909. Serial No. 488,196.

*To all whom it may concern:*

Be it known that I, ARTHUR A. OWENS, a citizen of the United States of America, and resident of Springfield, in the county of Greene and State of Missouri, have invented certain new and useful Improvements in Fishing-Floats, of which the following is a specification.

This invention relates to fishing and trapping and particularly to a float for fishing lines.

An object of this invention is to provide a float having novel means for securing the line to the float to increase the friction between the lines and float as compared with detachable floats now in ordinary use, the object being to obviate movement of the float with relation to the line unless properly manipulated; a float made in accordance with this invention being very easily operated by the hand of the user for the purpose of moving the float on the line when it is desired to increase or diminish the depth or distance from the float to the end of the line.

A further object of this invention is to produce a float having a line applied to the external surface thereof so that the friction on the line while it is being manipulated will not be sufficient to wear or impair the line as is the case with floats in which the line is inserted through the body of the float.

A further object of this invention is to provide a float which will retain its place on the line and which will also prove to be quickly and easily applied to or removed from the line through a rotary motion of the float with relation to the line.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 is a view in elevation of a float embodying the invention, shown applied to a line; Fig. 2 is a detail view of one of the members adapted to coact with the float and stem applied to the float; Fig. 3 illustrates an end view of the float with the attachment omitted.

In these drawings 3, indicates a float which may be of cork, wood, or other material or if desired it may be of a hollow metallic body having an opening therethrough designed to receive the stem 4, which stem is slidable longitudinally in the opening formed centrally, preferably, of the said float.

As shown in Fig. 1, the stem projects from the ends of the cork a suitable distance and the said stem passes through the coils 5, 5, formed on the end of the metallic strip 6, which metallic strip passes over and in engagement with the external surface of the float. The coils have deflected ends 7, in order that a line 8, may be inserted between the ends 7 of the coils and the stem when the line is to be fastened in operative relation to the float. As shown in Fig. 1, a rotation of the metallic strip 6, with the float will result in turning the coils 5, so that the line 8, would be threaded between the coils and the stem and when in this position, an attempt to draw the line longitudinally of the float would result in friction on the line between the coils and stem and between the line and the external surface of the float, the drag of which will prevent movement of the line with relation to the float under ordinary surface conditions. When, however, it is desirable to move the float with relation to the line a pull on the line at a point between the coils would cause the line to pass between one of the coils and the stem without undue friction and then by drawing the line through the opposite coil, it follows that the friction between the line and the float would be obviated and the friction to be overcome between the coils and the stem would be between one coil and the stem at each operation. Or, if desired, a slight rotation of the float would result in a disengagement of the coils from the line and the float could be moved to an appropriate position with relation to the line and again secured to the line by a slight rotation of the float to cause a reëngagement of the parts as shown in Fig. 1.

By having the coils engage the stem, movement of the stem with relation to the float is obviated. The strip 6 is yoke-like in its operation in that it connects the two ends of the stem and at the same time holds all of the parts in their operative positions.

As shown in the drawing, the strip 6, is preferably of such length that the coils 5 thereon are just beyond the ends of the float in order that the float may engage the said coils to prevent movement of the float on the stem.

I claim—

1. In a fishing float, a body or float proper having an opening therethrough, a stem in the opening having its ends projecting from the ends of the float, a strip of material having its ends coiled, the distance between the coils being equal to the length of the float, the said stem extending through the coils and through the float.

2. In a fishing float, a body having an opening therein and longitudinally thereof, a stem therein, a member having its ends coiled and designed to receive the stem, the said member engaging the external surface of the float and deflected ends for the coils designed to coact with the stem.

3. In a fishing float, a body or float proper having an opening therethrough, a stem in the opening having its ends projecting from the ends of the float, a strip of material having its ends coiled, the strip of material extending longitudinally of the outer surface of the body with the coils thereof in engagement with the stem.

4. In a fishing float, a body having an opening therein longitudinally thereof, a stem in the opening, a member having its ends coiled, the said coils being designed to receive the stem, the said member engaging the external surface of the float and capable of being turned with or independently of the said float.

In testimony whereof, I affix my signature in the presence of two witnesses.

ARTHUR A. OWENS.

Witnesses:
JOHN B. NEFF,
ELMER G. WODLOW.